United States Patent [19]

Maitz

[11] Patent Number: 5,348,680
[45] Date of Patent: Sep. 20, 1994

[54] CLEANING COMPOSITION FOR REMOVING REACTIVE POLYURETHANE HOT MELT ADHESIVES

[75] Inventor: Franz Maitz, Bruckmühl, Fed. Rep. of Germany

[73] Assignee: H. B. Fuller Licensing & Financing, Inc., Wilmington, Del.

[21] Appl. No.: 980,606

[22] Filed: Nov. 23, 1992

[30] Foreign Application Priority Data

Nov. 27, 1991 [DE] Fed. Rep. of Germany ... 9114780[U]

[51] Int. Cl.$^5$ ............................ C11D 7/26; C11D 7/50
[52] U.S. Cl. .................................. 252/162; 252/163; 252/164; 252/173; 252/DIG. 2; 252/DIG. 3; 252/174.25; 134/42
[58] Field of Search .............. 252/162, 163, 164, 173, 252/DIG. 2, DIG. 3, 174.25; 134/42

[56] References Cited

U.S. PATENT DOCUMENTS

| | | | |
|---|---|---|---|
| 4,076,633 | 2/1978 | Edwards et al. | 252/8.75 |
| 4,331,611 | 5/1982 | Mookherjee et al. | 260/464 |
| 4,396,521 | 8/1983 | Burrello | 252/118 |
| 4,976,788 | 12/1990 | Nohr et al. | 134/5 |

FOREIGN PATENT DOCUMENTS 0537736  4/1993  European Pat. Off. .

OTHER PUBLICATIONS

CA Registry #666-84-2 1993 * No Month Available.
CA Registry #27043-34-1 1993 * No month available.

*Primary Examiner*—Paul Lieberman
*Assistant Examiner*—Michael P. Tierney
*Attorney, Agent, or Firm*—Vidas, Arrett & Steinkraus

[57] ABSTRACT

A cleaning compound for removing reactive polyurethane (PUR) hot melt adhesives from production and processing devices, machines and equipment which includes at least one reactive monofunctional hydroxyl compound which can react with the reactive isocyanate groups of the hot melt adhesive. The monohydroxy functional compound of the invention's cleaning compound completely saturates the remaining NCO groups of the hot melt adhesive to be removed, converting the adhesive into non-reactive, meltable compounds which are soluble in the cleaning compound.

12 Claims, No Drawings

CLEANING COMPOSITION FOR REMOVING REACTIVE POLYURETHANE HOT MELT ADHESIVES

BACKGROUND OF THE INVENTION

The invention relates to a cleaning composition for removing reactive polyurethane (PUR) hot melt adhesive compositions from production and processing devices, machines and equipment, in particular application apparatus and the like.

Known cleaning composition are formed by substances which do not react chemically with the hot melt adhesive, instead only mixing with the adhesive which remains in and is to be removed from, the apparatus to be cleaned, and only diluting and displacing said adhesive.

A known cleaning composition of this kind consists of a mixture of an ethyl vinyl acetate (EVA) polymer with a resin component. The EVA polymer does not mix well with conventional PUR hot melt adhesives. Moreover, the hot melt adhesive—due to its still reactive NCO functionality—continues to react in the mixture to give cross-linked products which are very difficult to remove since they are unmeltable and essentially insoluble in the compositions, and therefore form deposits.

As an alternative, compositions have recently been discussed (unpublished information) which are obtained by adding an exact amount (no excess) of a monofunctional alcohol to a reactive hot melt adhesive, whereby the reactive NCO groups of the PUR hot melt adhesive which are still present are completely stoichiometrically saturated by the hydroxyl groups of the monofunctional alcohol. The mass thus formed, which in total is not reactive (anymore), approximately corresponds to the known cleaning composition on EVA basis in its application properties, and specifically does not react with the PUR adhesive in the apparatus during cleaning. These compounds, therefore, when used to remove unreacted adhesive, would also exhibit the disadvantage that no neutralization of the reactive NCO groups of the PUR hot melt adhesive is achieved so that in this case, too, the PUR hot melt adhesive would continue to react even during cleaning. The PUR hot melt adhesive again would react to give unmeltable and insoluble end products which are very difficult to remove.

SUMMARY OF THE INVENTION

A cleaning composition for PUR hot melt adhesives should meet the following requirements:

The cleaning composition should mix well with the PUR hot melt adhesive.

The cleaning composition should suppress a further reaction of the reactive PUR hot melt adhesive which reaction would result in structures leading to the formation of unmeltable products insoluble in the cleaning composition.

The cleaning compound should not itself cause any undesirable reactions.

Thus it is an object of the present invention to provide cleaning compositions of the aforementioned kind which meet these requirements and overcome the above-mentioned disadvantages of the prior art.

For achieving this object, the invention provides for the cleaning composition to contain an NCO reactive monohydroxy functional compound as an essential component, besides, in case, other additional components. The monohydroxy functional compound of the invention's cleaning composition completely saturates the remaining NCO groups of the hot melt adhesive to be removed, converting the adhesive into non-reactive, meltable compounds which are soluble in the cleaning composition.

In a preferred embodiment of the invention, the cleaning composition contains a mixture of a, preferably plastically deformable, mass which does not react with the PUR hot melt adhesive to be removed, and a monohydroxy functional compound which is capable of completely neutralizing the remaining NCO groups of the PUR hot melt adhesive.

Advantageous further embodiments are defined in the subclaims.

If no non-reactive additional component is to be incorporated, the NCO reactive compound can e.g. be abietyl alcohol.

Preferably a non-hardening polyurethane compound is used as the non-reacting mass of the cleaning composition. Polyol polymers, in particular polyesters and polyethers, are suitable as starting material for this purpose. After complete stoichiometrical saturation of the hydroxyl functions of the polyol polymer e.g. with a monofunctional isocyanate compound, a monohydroxy functional compound with NCO reactive properties is added as a second component, preferably in amounts of 10 to 100 milli-equivalents (based on 100 g of total compound).

During use of the cleaning composition, this NCO reactive mono hydroxy functional component completely saturates or neutralizes the remaining isocyanate groups of the polyurethane hot melt adhesive to be removed, turning the latter into a non reactive, soluble end product.

As an alternative, the non-reacting mass can be formed from a moisture-reactive hot melt adhesive similar to the PUR hot melt adhesive to be removed, the NCO functionality of the former being fully stoichiometrically saturated with a mono hydroxy functional compound. In this case, too, a content of in particular 10 to 100 milli-equivalents (based on 100 g of total compound) of a monohydroxy functional compound is additionally provided as the NCO reactive component, which completely saturates the residual NCO functionality of the PUR hot melt adhesive to be cleaned and removed, and converts the adhesive into a non-reactive soluble form.

Advantageously, both the two monohydroxy functional compounds are identical in this case, i.e. in producing the cleaning composition, hot melt adhesive is simply reacted with a suitable excess of a monofunctional hydroxyl compound.

The NCO reactive monohydroxy functional compound is chosen with regard to the conditions of intended application of the invention's cleaning composition. Suitable monohydroxy functional compounds are e.g. abietyl alcohol and monovalent alcohols or partially etherified monomeric or polymeric polyols, e.g. on PEG or PPG basis, hydroxy carboxylic acid esters, polycaprolactones and the like.

As the temperature during the cleaning process is typically 130° to 150° C., the flame point or ignition temperature should be correspondingly high. On the other hand, compounds having a low molecular weight are preferred, since the consumption of substance is thus automatically reduced and favorable melting and solution characteristics of the reaction product are obtained.

Monohydroxyl polyethers are particularly suited as monohydroxy functional compounds since all of them have high flame points. The high molecular weight of these compounds, however, can be disadvantageous in some applications.

The use of abietyl alcohol as the monohydroxy functional compound in one-component cleaning compounds is preferred. For cleaning compounds consisting of a mixture including non reactive carriers, the use of methyl benzyl alcohol has proven to be particularly advantageous. Both monohydroxy functional compounds excellently meet the above-mentioned requirements.

To completely neutralize the moisture-reactive PUR hot melt adhesive, the cleaning composition is preferably used at an NCO:OH ratio of 1:1 with respect to the PUR hot melt adhesive to be removed. The content of NCO reactive compound in the cleaning composition can be favorably chosen such that the desired NCO:OH ratio corresponds to the mixing ratio of cleaning composition:hot melt adhesive.

In case, the cleaning composition may also contain resin, plasticizer, wax, non-NCO-reactive polymers and the like as additional components, e.g. to influence and adjust the viscosity and processing properties of the polymer compositions.

The two following embodiment examples are merely provided to elucidate the invention but are not intended to restrict it in any way.

EMBODIMENT EXAMPLE 1

A cleaning compositions is produced from abietyl alcohol at an NCO:OH ratio of 1:1 with regard to the PUR hot melt adhesive to be removed, the viscosity and the processing properties being correspondingly adjusted by adding resin, wax and the like. Abietol-E TM by Hercules is used as the abietyl alcohol.

EMBODIMENT EXAMPLE 2

A cleaning composition is produced by stoichiometrically reacting high molecular weight polycaprolactone having a low content of OH groups with tosyl isocyanate as the monofunctional isocyanate compound, until the free hydroxyl groups of the polycaprolactone are fully neutralized. Subsequently approx. 5% of methyl benzyl alcohol is added as the NCO reactive component. The viscosity is adjusted by adding resin.

EMBODIMENT EXAMPLE 3

A cleaning composition is produced by mixing Ipatherm ®S 14/176 (a polyurethane hot melt adhesive containing about 2% of remaining or residual NCO functionality) with methyl benzyl alcohol at an excess of about 5% of the amount necessary for completely saturating the NCO groups still present in the adhesive to be removed.

What is claimed is:

1. A cleaning composition for removing reactive polyurethane (PUR) hot melt adhesives having reactive isocyanate (NCO) groups therein from production and processing devices, machines and equipment, said cleaning composition consisting essentially of at least one monofunctional hydroxyl containing compound selected from the group consisting of hydroxy functional ether or alcohol compounds which can react with the reactive isocyanate groups of the hot melt adhesive when applied to a substrate to be cleaned, said monofunctional hydroxyl containing compound being the sole compound of the composition capable of reacting with the NCO groups and a plastically deformable material which in conditions of use in removing reactive polyurethane (PUR) hot melt adhesives from production and processing devices, machines and equipment, does not react with the isocyanate groups of the PUR hot melt adhesive.

2. The cleaning composition according to claim 1, wherein the monofunctional hydroxyl containing compound is a hydroxy ether.

3. The cleaning composition according to claim 2, wherein the cleaning composition contains, as the NCO reactive monohydroxy functional compound, a compound which can be reacted with the PUR hot melt adhesive to be removed to give non-reactive meltable compounds which are soluble in the cleaning composition.

4. The cleaning composition according to claim 1, wherein the cleaning composition contains the NCO reactive monofunctional hydroxy compound in an amount of a 10 to 100 milli-equivalents, based on 100 grams of total cleaning composition.

5. The cleaning composition according to claim 1, wherein the cleaning composition contains the stoichiometric reaction product of a polymeric polyol component and a monofunctional isocyanate compound as the non-reacting mass.

6. The cleaning composition according to claim 1, wherein the cleaning composition contains the stoichiometric reaction product of polyurethane hot melt adhesive based on a monohydroxy functional compound as the non-reacting mass.

7. The cleaning composition according to claim 1, wherein the monohydroxy functional compound is methyl benzyl alcohol.

8. The cleaning composition according to claim 1, wherein the non-reacting mass comprises a polyester, a polyether, a polyether ester or a polyester polyether copolymer.

9. The cleaning composition according to claim 1, wherein the cleaning composition comprises, as its NCO reactive monohydroxy functional compound, a compound which can be reacted with the hot melt adhesive to give non-reactive, meltable compounds that are soluble in the cleaning composition.

10. The cleaning composition according to claim 1 further comprising at least one additional component selected from the group consisting of resins, waxes, plasticizers, and non-NCO-reactive polymers, whereby the viscosity and processing properties of the polymer compound may be adjusted.

11. The cleaning composition according to claim 1 wherein one of the NCO reactive monohydroxy functional compounds is abietyl alcohol.

12. The cleaning composition according to claim 5, wherein the monofunctional isocyanate compound is tosyl isocyanate.

* * * * *